United States Patent [19]

Yamaguchi

[11] 4,429,958
[45] Feb. 7, 1984

[54] RELATIVELY WIDE ANGLE TELEPHOTO TYPE LENS SYSTEM

[75] Inventor: Tamikazu Yamaguchi, Sakai, Japan

[73] Assignee: Minolta Camera Kabushiki Kaisha, Higashi, Japan

[21] Appl. No.: 244,341

[22] Filed: Mar. 17, 1981

[30] Foreign Application Priority Data

Mar. 24, 1980 [JP] Japan .................................. 55-37775
Aug. 22, 1980 [JP] Japan ................................ 55-116282

[51] Int. Cl.³ ...................... G02B 9/60; G02B 9/62; G02B 15/14
[52] U.S. Cl. .................................. 350/455; 350/464; 350/465
[58] Field of Search ................. 350/454, 455, 464, 465

[56] References Cited

U.S. PATENT DOCUMENTS 2,503,789  4/1950  Wood et al. .
3,868,174  2/1975  Yakota ................................. 350/455
3,887,269  6/1975  Nakagawa ........................... 350/455
4,063,801  12/1977  Yakota ............................... 350/455
4,204,747  5/1980  Imai .

FOREIGN PATENT DOCUMENTS 54-76147  6/1979  Japan .
55-73014  6/1980  Japan .

*Primary Examiner*—John K. Corbin
*Assistant Examiner*—Rebecca D. Gass
*Attorney, Agent, or Firm*—Jackson, Jones & Price

[57] ABSTRACT

A wide angle telephoto type lens system is provided having from object to image side a first positive lens component, a second negative lens component, a third positive lens component, a fourth positive lens component, and a rearmost fifth negative lens component having a concave object side surface and a convex image side surface.

30 Claims, 32 Drawing Figures

Spherical Aberration

FIG.4b

Astigmatism

FIG.4c

Distortion

FIG.5a

Spherical Aberration

FIG.5b

Astigmatism

FIG.5c

Distortion

FIG.6a

Spherical Aberration

FIG.6b

Astigmatism

FIG.6c

Distortion

FIG.7a
Spherical Aberration

FIG.7b
Astigmatism

FIG.7c
Distortion

FIG.8a
Spherical Aberration

FIG.8b
Astigmatism

FIG.8c
Distortion

Spherical Aberration

FIG.11b

Astigmatism

FIG.11c

Distortion

FIG.12a

Spherical Aberration

FIG.12b

Astigmatism

FIG.12c

Distortion

FIG.13a
Spherical Aberration

FIG.13b
Astigmatism

FIG.13c
Distortion

FIG.14a
Spherical Aberration

FIG.14b
Astigmatism

FIG.14c
Distortion

RELATIVELY WIDE ANGLE TELEPHOTO TYPE LENS SYSTEM

BACKGROUND OF THE INVENTION

1. Field of the Invention

The present invention relates to a lens system for use in a camera with a range-finder and, more particularly, to a compact telephoto type lens system with improved focusing capabilities.

2. Description of the Prior Art

In the optical and photography fields, there is a constant demand to provide improved compact cameras and lens systems. Recent advances in automating numerous camera features have further complicated camera designs with regard to space and have imposed increased limitations on the accompanying lens designs.

Camera designers have attempted to take advantage of telephoto type lens designs to decrease the total length of the entire lens system, see U.S. Pat. No. 4,204,747. To decrease the total length of the lens system, a negative refractive power on the rear side of the lens system has been found favorable for reducing the telephoto ratio. This design approach has been generally limited to a telephoto lens system with a relatively narrow field angle because lens systems with wide field angles usually experience increases in aberrations with an increase in field angle.

Japanese Patent Application Laid Open No. 54-76147 discloses a relatively wide angle telephoto lens system with a rearmost lens element of a positive value. U.S. Pat. No. 2,503,789, while not directed to a telephoto lens system, is cited for its feature of focusing by shifting a rearmost negative lens group. Finally, Japanese Patent Application Laid Open No. 54-73014 has a publication date of June 6, 1980, and is cited of general interest.

Camera manufacturers are still seeking an optimum relatively wide angle lens system that can be readily and economically manufactured to provide not only a compact camera with an expected level of optical performance, but a lens system that is particularly adaptable to accommodating recent camera innovations such as auto focusing.

SUMMARY OF THE INVENTION

An object of the present invention is to provide a relatively wide angle lens system of a compact design.

Another object of the present invention is to provide a telephoto type relatively wide angle lens system with aberrations sufficiently corrected.

A further object of the present invention is to provide a compact lens system with a field angle of approximately 65 degrees and a relatively high speed, such as F 3.5 to F 2.8.

According to the present invention, the lens system is of a telephoto type with a telephoto ratio about 1.0 and comprises, at the image side of an aperture stop, a plurality of lens components including a rearmost negative lens component with a concave object side surface and a convex image side surface. In the plurality of lens components, the lens component next to the image side of the aperture stop may be positive or negative. When this lens component is positive, the lens system according to the present invention fulfills the following conditions:

$0.03f < Da < 0.12f$ $0.06f < Db < 0.15f$, wherein Da and Db represent the air spaces on the object and image sides of the positive lens component and f represents the focal length of the whole lens system.

Further, according to the present invention, the lens system comprises a rearmost negative lens which is shiftable along the optical axis for focusing. The radius of curvature, Rb of the object side surface of the shiftable lens fulfills the following condition:

$0.45 < Rb/f < -0.18$.

The features of the present invention, which are believed to be novel, are set forth with particularity in the appended claims. The present invention, both as to its organization and manner of operation, together with further objects and advantages thereof, may be best understood by reference to the following description, taken in conjunction with the accompanying drawings.

DETAILED DESCRIPTION OF THE PREFERRED EMBODIMENTS

The following description is provided to enable any person skilled in the optical art to make and use the invention and sets forth the best modes contemplated by the inventor for carrying out his invention. Various modifications, however, will remain readily apparent to those skilled in the art, since the generic principles of the present invention have been defined herein specifically to provide a relatively wide angle telephoto type lens system that can be manufactured economically.

The present invention represents the parameters of a compromise balance of acceptable aberrations in a telephoto type lens system.

In the accompanying drawings which supplement the following tables, the lenses, in accordance with the present invention, are illustrated diagrammatically. As usual in conventional lens diagrams, light is assumed to travel from left to right. Individual lens groups are designated by the letter L with a subscript number corresponding to the consecutive numbers of the lens groups from object to image side. The radii of curvature of the lenses are indicated by R, with a subscript number corresponding to consecutive numbers of the lens surfaces of the lens elements. The axial distances, D, along the optical axis are set forth both in the tables and in the drawings and include both the axial spacings between the lens elements and the thickness of the lens elements. Finally, the refractive index, N, and the Abbe number, $v$, are provided in each of the tables. Since the specific lens parameters are provided herein to meet the requirements of a full disclosure adequate to convey the present invention to a lens designer, they should not be construed as limiting to any specific lens design as set forth in an individual embodiment. As used throughout the specification and claims, the term "component" can mean one or more lens elements.

As is apparent from FIGS. 1, 2, 3, 9 and 10, a telephoto type relatively wide angle lens system according to the present invention has an object side principal point located outside the lens system because of its telephoto type power distribution. These lens systems comprise, from the object side to the image side, a first positive lens component ($L_1$) having a convex object side surface ($R_1$) and a concave image side surface ($R_2$); a second negative lens component ($L_2$); a third positive lens component ($L_3$); an aperture stop (S), and a plurality of lens components ($L_4$, $L_5$) at the image side of the aperture stop (S), including a rearmost negative lens component ($L_5$) having a concave object side surface and a convex image side surface.

Figure 1:
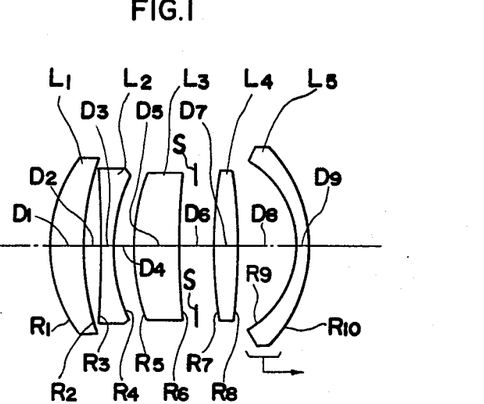
FIG. 1 represents a schematic cross sectional view of a first embodiment of the present invention.
Figure 2:
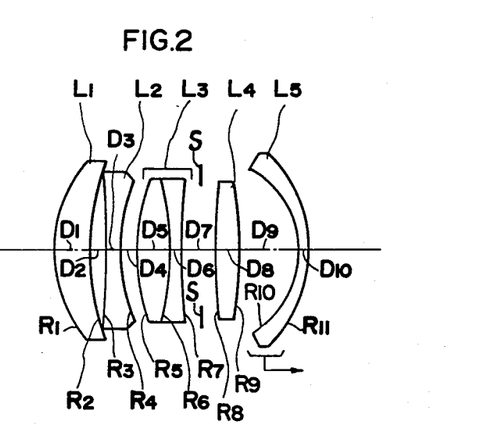
FIG. 2 represents a schematic cross sectional view of a second embodiment of the present invention.
Figure 3:
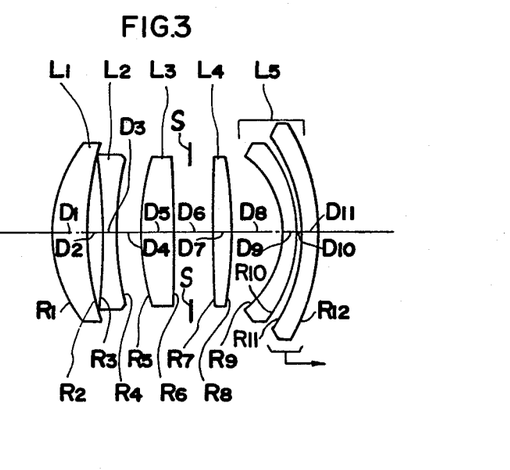
FIG. 3 represents a schematic cross sectional view of third and fourth embodiments of the present invention.
Figure 4A:
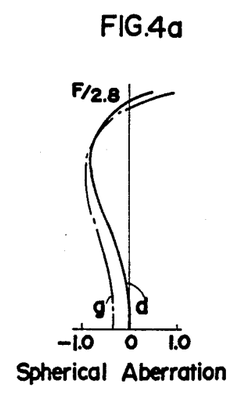
FIGS. 4a, 4b and 4c represent the graphic plots of the aberration curves of the first embodiment.
Figure 4B:
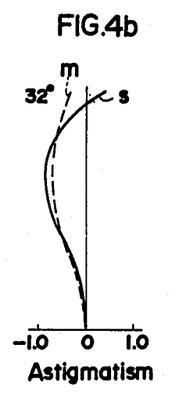
Figure 4C:
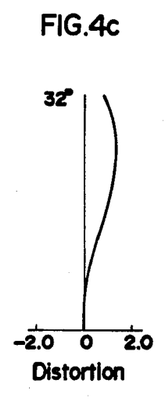
Figure 5A:
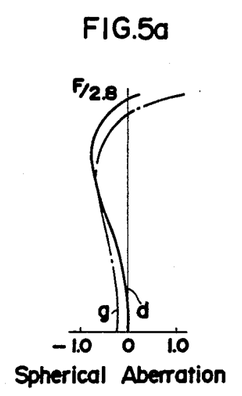
FIGS. 5a, 5b and 5c represent the graphic plots of the aberration curves of the second embodiment.
Figure 5B:
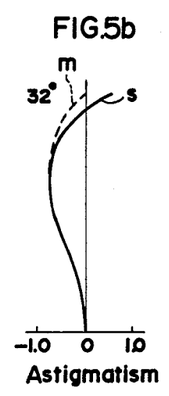
Figure 5C:
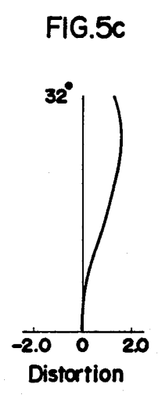
Figure 6A:
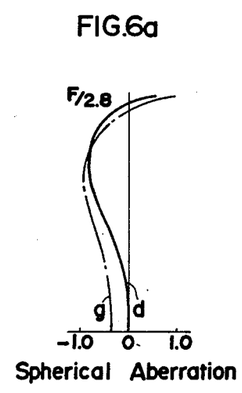
FIGS. 6a, 6b and 6c represent the graphic plots of the aberration curves of the third embodiment.
Figure 6B:
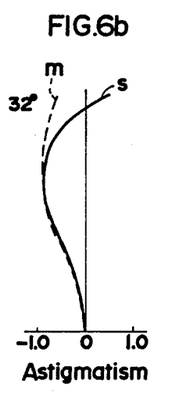
Figure 6C:
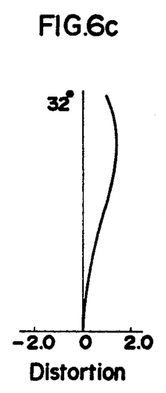
Figure 7A:
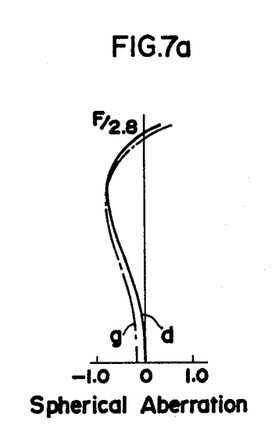
FIGS. 7a, 7b and 7c represent the graphic plots of the aberration curves of the fourth embodiment.
Figure 7B:
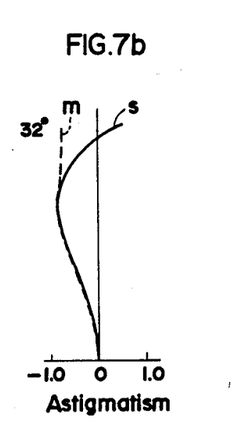
Figure 7C:
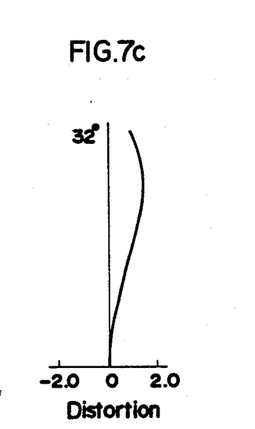

With respect to FIGS. 1 to 3, the telephoto type relatively wide angle lens system according to the present invention is defined by further novel features which comprise from the object to the image side: a frontmost first positive lens component ($L_1$) having a convex object side surface ($R_1$) and a concave image side surface ($R_2$); a second negative lens component ($L_2$); a third positive lens component ($L_3$); a fourth positive lens component ($L_4$); and a rearmost fifth negative lens component ($L_5$) having a concave object side surface and a convex image side surface.

As to FIG. 2, the third positive lens component ($L_3$) consists of a doublet, while the rearmost fifth lens component consists of a pair of negative meniscus single lens elements both concave to the object side in case of FIG. 3. In addition, other modifications, such as an adoption of a doublet as lens component $L_2$ or $L_3$, or a division of lens components, e.g., $L_2$, $L_3$, and $L_4$, into a pair of separate lenses, are possible within the parameters of the present invention.

The lens systems in FIGS. 1 to 3 further fulfill the following conditions:

$$0.03f < Da < 0.12f \quad (1)$$

$$0.06f < Db < 0.15f \quad (2)$$

wherein f represents the focal length of the whole lens system; Da represents the air space between the third lens component ($L_3$) and the fourth lens component ($L_4$); and Db represents the air space between the fourth lens component ($L_4$) and the rearmost fifth negative lens component ($L_5$).

The above condition (1) is principally for providing a balanced correction of both coma and distortion. Since the lens system according to the present invention is of a telephoto type, a positive distortion is inherent in its design. The correction of such a positive distortion can be considerably difficult. According to the present invention, the positive distortion is corrected by means of increasing the air space Da between the third and fourth lens components ($L_3$) and ($L_4$) to thereby increase the height of off-axial rays entering the fourth lens component ($L_4$) which bears a positive refractive power on the rear side of the lens system. Regretfully, the increase of the air space Da is unfavorable for correcting coma. In this situation, condition (1) has been found to achieve a proper balance for correcting both distortion and coma.

Condition (2) is required for correcting coma while maintaining the telephoto ratio below a desirable value. If the air space Db between the fourth and fifth lens component ($L_4$) and ($L_5$) is increased, the negative refractive power of the fifth lens component ($L_5$) has to be strengthened to maintain a small telephoto ratio, while the negative refractive power of the fifth lens component ($L_5$) should be weakened if the air space Db is reduced. Thus, the balance between the respective radii of curvatures in the fifth lens component ($L_5$) depends on the air space Db. Additionally, coma is greatly affected by the balance between the respective radii of curvatures in the fifth lens component ($L_5$) as well as the angle of incidence of the rays entering the fifth lens component ($L_5$). Accordingly, it is impossible to correct coma and also reduce the telephoto ratio if condition (2) is violated.

With respect to FIGS. 1 to 3, it is further recommended that the following conditions be fulfilled:

$$N_2 > 1.7 \quad (3)$$

$$0.95 < N_2/N_1 < 1.1 \quad (4)$$

$$0.3f < Ra < 1.2f \quad (5)$$

wherein $N_1$ and $N_2$ represent the refractive indices of glass material for the first and second lens components ($L_1$) and ($L_2$), respectively, Ra represents the radius of curvature of the image side surface of the second lens component ($L_2$), and f represents the focal length of the whole lens system. In the above equations, $N_1$ and $N_2$ should be interpreted as average values if the first lens component ($L_1$) or the second lens component ($L_2$) includes a plurality of lens elements and correspondingly a plurality of different kinds of glass material.

When a telephoto type design approach is applied to a lens system for making the system compact, negative refractive powers are unevenly distributed in the system, which are apt to cause an excessive correction of spherical aberration and an undesirable field curvature due to a decrease of the Petzval sum. For correcting these problems, it is necessary to use a glass material of a relatively high refractive index, $N_2$, for the second lens component, ($L_2$), to which a considerable negative refractive power is distributed. Condition (3) is provided for this purpose.

The above-mentioned spherical aberration and field curvature may also be corrected by the means of relatively reducing the refractive index $N_1$ for the first lens component ($L_1$) which bears a considerable positive refractive power. However, coma cannot be sufficiently corrected if the balance between the refractive indices $N_1$ and $N_2$ are not taken into consideration. Condition (4) represents a proper balance, and coma would not be corrected if the upper limit of condition (4) is exceeded. On the contrary, if the lower limit of condition (4) is violated, it would be difficult to correct spherical aberration and field curvature.

Condition (5) mainly relates to Rinnenfehler. A relatively great radius of curvature Ra for the image side surface of the second lens component ($L_2$) is possible by means of using a relatively high index glass for the second lens component ($L_2$), and is further favorable in a manufacturing procedure. However, an excessively great radius of curvature Ra results in an increase of Rinnenfehler to deteriorate the contrast of the image. On the other hand, an excessively small radius of curvature Ra would render it difficult to correct spherical aberration and coma. Condition (5) balances these factors.

Tables 1 and 2 show first and second embodiments corresponding to FIGS. 1 and 2, respectively. Tables 3 and 4 show third and fourth embodiments both within the concept of FIG. 3. FIGS. 4 to 7 correspond to the aberration curves of the first to fourth embodiments in an infinity focusing condition, respectively.

TABLE 1

(Embodiment 1)
$f = 100$  $1:2.8$  $2\omega = 65°$

| | Radius of Curvature | Axial Distance | Refractive Index | Abbe Number |
|---|---|---|---|---|
| $L_1$ | $R_1 = 29.42$ | $D_1 = 7.33$ | $N_1 = 1.7883$ | $\nu_1 = 47.3$ |
| | $R_2 = 57.95$ | $D_2 = 3.53$ | | |
| $L_2$ | $R_3 = -365.7$ | $D_3 = 3.03$ | $N_2 = 1.7330$ | $\nu_2 = 28.2$ |
| | $R_4 = 38.11$ | $D_4 = 3.94$ | | |
| $L_3$ | $R_5 = 40.82$ | $D_5 = 9.52$ | $N_3 = 1.7200$ | $\nu_3 = 50.3$ |
| | $R_6 = 175.1$ | $D_6 = 7.29$ (Aperture Stop) | | |
| $L_4$ | $R_7 = 126.4$ | $D_7 = 4.60$ | $N_4 = 1.7755$ | $\nu_4 = 37.9$ |
| | $R_8 = -229.4$ | $D_8 = 12.46$ | | |
| $L_5$ | $R_9 = -20.87$ | $D_9 = 2.10$ | $N_5 = 1.7440$ | $\nu_5 = 44.9$ |
| | $R_{10} = -30.53$ | | | |

TABLE 2

(Embodiment 2)
$f = 100$  $1:2.8$  $2\omega = 65°$

| | Radius of Curvature | Axial Distance | Refractive Index | Abbe Number |
|---|---|---|---|---|
| $L_1$ | $R_1 = 28.98$ | $D_1 = 7.48$ | $N_1 = 1.7883$ | $\nu_1 = 47.3$ |
| | $R_2 = 62.04$ | $D_2 = 3.00$ | | |
| $L_2$ | $R_3 = -338.0$ | $D_3 = 3.21$ | $N_2 = 1.7400$ | $\nu_2 = 28.3$ |
| | $R_4 = 35.64$ | $D_4 = 4.01$ | | |
| $L_3$ | $R_5 = 46.34$ | $D_5 = 6.81$ | $N_3 = 1.7856$ | $\nu_3 = 42.8$ |
| | $R_6 = -59.05$ | $D_6 = 2.57$ | $N_4 = 1.7400$ | $\nu_4 = 37.5$ |
| | $R_7 = 228.4$ | $D_7 = 7.03$ (Aperture Stop) | | |
| | $R_8 = 178.4$ | | | |

TABLE 2-continued (Embodiment 2)
$f = 100$  $1:2.8$  $2\omega = 65°$

| | Radius of Curvature | Axial Distance | Refractive Index | Abbe Number |
|---|---|---|---|---|
| $L_4$ | $R_9 = -125.9$ | $D_8 = 4.50$ | $N_5 = 1.6645$ | $\nu_5 = 35.8$ |
| | | $D_9 = 12.61$ | | |
| $L_5$ | $R_{10} = -22.05$ | $D_{10} = 2.35$ | $N_6 = 1.7856$ | $\nu_6 = 42.8$ |
| | $R_{11} = -32.74$ | | | |

TABLE 3

(Embodiment 3)
$f = 100$  $1:2.8$  $2\omega = 65°$

| | Radius of Curvature | Axial Distance | Refractive Index | Abbe Number |
|---|---|---|---|---|
| $L_1$ | $R_1 = 29.22$ | $D_1 = 7.20$ | $N_1 = 1.7650$ | $\nu_1 = 50.1$ |
| | $R_2 = 60.79$ | $D_2 = 3.43$ | | |
| $L_2$ | $R_3 = -194.1$ | $D_3 = 2.62$ | $N_2 = 1.8052$ | $\nu_2 = 25.4$ |
| | $R_4 = 51.01$ | $D_4 = 5.33$ | | |
| $L_3$ | $R_5 = 53.15$ | $D_5 = 6.69$ | $N_3 = 1.7856$ | $\nu_3 = 42.8$ |
| | $R_6 = -588.3$ | $D_6 = 8.57$ (Aperture Stop) | | |
| $L_4$ | $R_7 = 319.3$ | $D_7 = 3.90$ | $N_4 = 1.6398$ | $\nu_4 = 34.6$ |
| | $R_8 = -112.5$ | $D_8 = 11.0$ | | |
| $L_5$ | $R_9 = -20.85$ | $D_9 = 2.65$ | $N_5 = 1.7234$ | $\nu_5 = 37.9$ |
| | $R_{10} = -27.20$ | $D_{10} = 1.58$ | | |
| | $R_{11} = -33.33$ | $D_{11} = 2.66$ | $N_6 = 1.7440$ | $\nu_6 = 44.9$ |
| | $R_{12} = -47.48$ | | | |

TABLE 4

(Embodiment 4)
$f = 100$  $1:2.8$  $2\omega = 65°$

| | Radius of Curvature | Axial Distance | Refractive Index | Abbe Number |
|---|---|---|---|---|
| $L_1$ | $R_1 = 31.00$ | $D_1 = 7.35$ | $N_1 = 1.7495$ | $\nu_1 = 50.1$ |
| | $R_2 = 56.92$ | $D_2 = 3.99$ | | |
| $L_2$ | $R_3 = -113.7$ | $D_3 = 2.92$ | $N_2 = 1.8052$ | $\nu_2 = 25.4$ |
| | $R_4 = 93.09$ | $D_4 = 6.03$ | | |
| $L_3$ | $R_5 = 50.42$ | $D_5 = 7.30$ | $N_3 = 1.6935$ | $\nu_3 = 53.4$ |
| | $R_6 = -316.2$ | $D_6 = 7.03$ (Aperture Stop) | | |
| $L_4$ | $R_7 = 227.6$ | $D_7 = 3.97$ | $N_4 = 1.683$ | $\nu_4 = 32.1$ |
| | $R_8 = -141.9$ | $D_8 = 10.4$ | | |
| $L_5$ | $R_9 = -25.29$ | $D_9 = 2.87$ | $N_5 = 1.7755$ | $\nu_5 = 37.9$ |
| | $R_{10} = -33.26$ | $D_{10} = 5.99$ | | |
| | $R_{11} = -24.51$ | $D_{11} = 2.86$ | $N_6 = 1.7440$ | $\nu_6 = 44.9$ |
| | $R_{12} = -36.72$ | | | |

Figure 9:
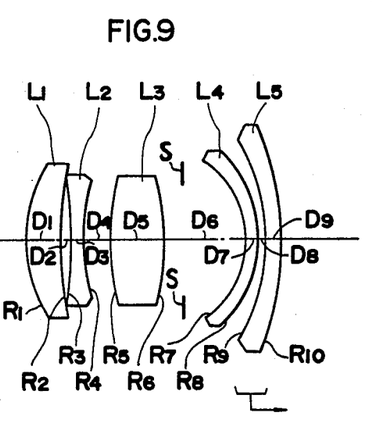
FIG. 9 represents a schematic cross sectional view of fifth and sixth embodiments of the present invention.
Figure 10:
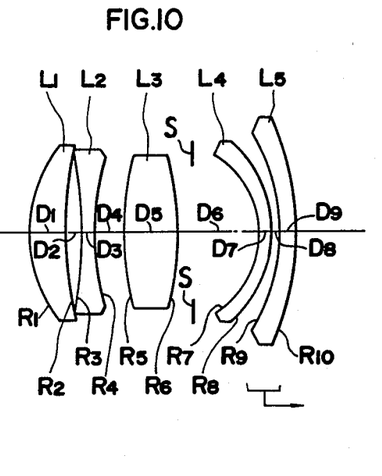
FIG. 10 represents a schematic cross sectional view of a seventh embodiment of the present invention.

With respect to FIGS. 9 and 10, novel features of a lens system according to the present invention are defined to comprise a 5-component 5-element lens system consisting of a frontmost first positive meniscus single lens element ($L_1$) convex to the object side, a second negative single lens element ($L_2$), a third bi-convex single lens element ($L_3$), a fourth negative meniscus single lens element ($L_4$) concave to the object side, and a rearmost fifth negative meniscus single lens element ($L_5$) concave to the object side.

With respect to the above-defined lens system, it is recommended to fulfill the following conditions:

$N_2 > N_1, N_2 > N_3$     (6)

$0.07f < D_1 + D_2 < 0.15f$     (7)

$0.04f < D_4 < 0.1f$     (8)

$0.06f < D_5 < 0.15f$     (9)

$-0.25f < R_7 < -0.116f$     (10)

$R_9 / R_7 < 1.2$     (11)

wherein $N_1$, $N_2$ and $N_3$ represent the refractive indices of the glass material for the first to third lens elements ($L_1$) to ($L_3$), respectively; $D_1$, $D_2$, $D_4$ and $D_5$ represent the axial distances numbered from the object side, respectively, and $R_7$ and $R_9$ represent the radii of curvature or refractive surfaces numbered from the object side, respectively.

In designing a wide angle lens system, it is generally important to correct field curvature especially among various aberrations. As to the correction of field curvature in a compact telephoto type lens system such as in the present invention, it is necessary to increase the refractive index for the negative lenses relative to that for the positive lenses, since the Petzval sum is apt to decrease. Condition (6) represents this requirement. However, a high refractive power required for the second lens element ($L_2$), which is representative of the negative refractive power in the system, to correct field curvature would cause an insufficiently corrected spherical aberration and a deterioration of coma. This spherical aberration can be corrected by selecting a relatively small radius of curvature within a predetermined range for the object side surface $R_7$ of the fourth lens element ($L_4$) which is located for rendering the lens system compact. Condition (10) shows that range.

The spherical aberration can also be corrected by reducing the radius of curvature $R_9$ of the fifth lens element ($L_5$). However, a reduced radius of curvature $R_9$ makes it difficult to correct coma. Therefore, condition (11) should be fulfilled in addition to condition (10).

The correction of coma is mainly achieved by relatively increasing the axial thickness of the third lens element ($L_3$) within the range defined by condition (9). If the lower limit of condition (9) is violated, the correction of coma would be difficult, while the compactness of the system would not be possible above the upper limit of condition (9).

The telephoto type lens system has by its nature a positive distortion. The difficulty in correcting such a positive distortion increases when the field angle is required to be relatively wide as in the present invention. In the case of the lens systems shown in FIGS. 9 and 10, the distortion generated at the first lens element ($L_1$) has to be sufficiently corrected by the succeeding second lens element ($L_2$), otherwise any design would fail to correct the final distortion. Condition (7) relates to this distortion correction. Namely, if the upper limit of condition (7) is violated, the correction of distortion would be insufficient since the height of the off-axial rays entering the second lens element ($L_2$) is decreased.

On the other hand, if the lower limit of condition (7) is violated, the marginal thickness of the first lens element ($L_1$), necessary for physically mounting it on the lens barrel, would not be maintained although the correction of distortion will be sufficient. In addition to condition (7), condition (8) cooperates for correcting distortion, wherein the air space $D_4$ is required to be increased so that off-axial rays may enter the third lens element ($L_3$) without experiencing significant distortion. Accordingly, correction of distortion would be insufficient if the lower limit of condition (8) is violated. On the other hand, coma correction would deteriorate if the upper limit of condition (8) is violated. Thus, condition (8) is required to balance the corrections for distortion and coma.

Figure 11A:
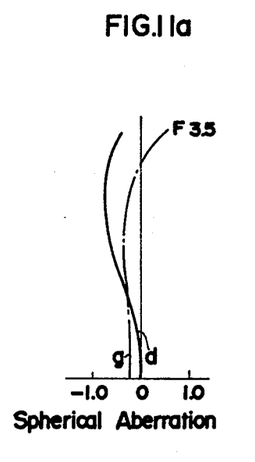
FIGS. 11a, 11b and 11c represent the graphic plots of the aberration curves of the fifth embodiment.
Figure 11B:
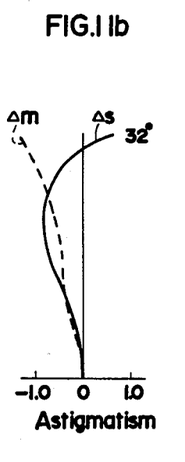
Figure 11C:
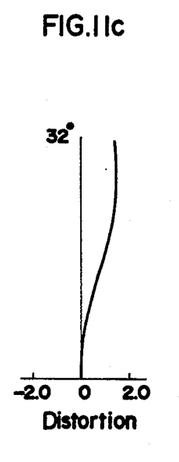
Figure 12A:
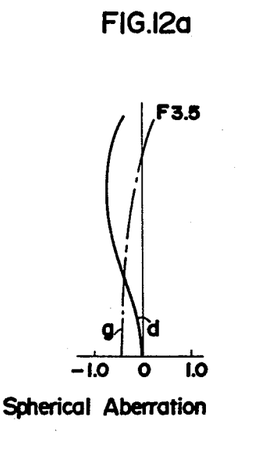
FIGS. 12a, 12b and 12c represents the graphic plots of the aberration curves of the sixth embodiment.
Figure 12B:
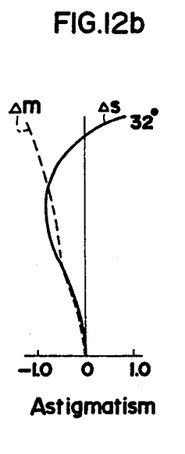
Figure 12C:
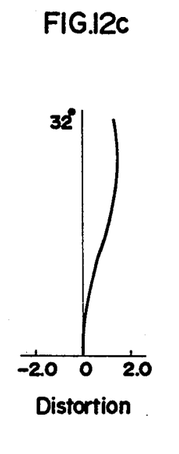
Figure 13A:
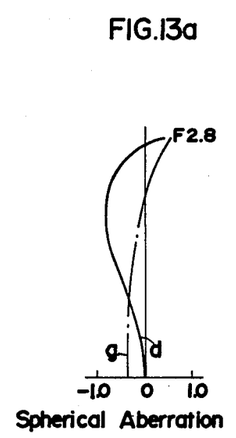
FIGS. 13a, 13b and 13c represent the graphic plots of the aberration curves of the seventh embodiment.
Figure 13B:
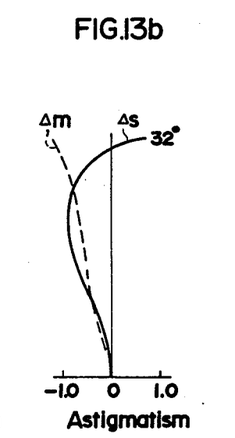
Figure 13C:
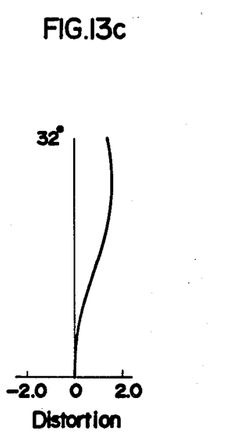

Tables 5 and 6 represent the fifth and sixth embodiments corresponding to FIG. 9, while Table 7 represents the seventh embodiment corresponding to FIG. 10. FIGS. 11 to 13 show the aberration curves of the fifth to seventh embodiments in infinity focusing condition, respectively.

TABLE 5

(Embodiment 5)
$F = 100 \ 1:3.5 \ 2\omega = 65°$

| | Radius of Curvature | Axial Distance | Refractive Index | Abbe Number |
|---|---|---|---|---|
| $L_1$ | $R_1 = 27.16$ | $D_1 = 7.29$ | $N_1 = 1.7170$ | $\nu_1 = 47.9$ |
| | $R_2 = 84.77$ | | | |
| | | $D_2 = 1.78$ | | |
| $L_2$ | $R_3 = -127.0$ | $D_3 = 2.65$ | $N_2 = 1.7552$ | $\nu_2 = 27.5$ |
| | $R_4 = 40.93$ | | | |
| | | $D_4 = 5.72$ | | |
| $L_3$ | $R_5 = 56.62$ | $D_5 = 10.97$ | $N_3 = 1.6676$ | $\nu_3 = 42.0$ |
| | $R_6 = -64.12$ | | | |
| | | $D_6 = 17.69$ | (Aperture Stop) | |
| $L_4$ | $R_7 = -18.62$ | $D_7 = 2.64$ | $N_4 = 1.7200$ | $\nu_4 = 50.3$ |
| | $R_8 = -23.56$ | | | |
| | | $D_8 = 1.49$ | | |
| $L_5$ | $R_9 = -41.67$ | $D_9 = 3.34$ | $N_5 = 1.7200$ | $\nu_5 = 50.3$ |
| | $R_{10} = -60.40$ | | | |

TABLE 6

(Embodiment 6)
$F = 100 \ 1:3.5 \ 2\omega = 65°$

| | Radius of Curvature | Axial Distance | Refractive Index | Abbe Number |
|---|---|---|---|---|
| $L_1$ | $R_1 = 26.80$ | $D_1 = 7.28$ | $N_1 = 1.7003$ | $\nu_1 = 47.7$ |
| | $R_2 = 85.96$ | | | |
| | | $D_2 = 1.75$ | | |
| $L_2$ | $R_3 = -123.5$ | $D_3 = 2.65$ | $N_2 = 1.7552$ | $\nu_2 = 27.5$ |
| | $R_4 = 41.47$ | | | |
| | | $D_4 = 5.65$ | | |
| $L_3$ | $R_5 = 60.59$ | $D_5 = 10.96$ | $N_3 = 1.7015$ | $\nu_3 = 41.2$ |
| | $R_6 = -66.15$ | | | |
| | | $D_6 = 17.58$ | (Aperture Stop) | |
| $L_4$ | $R_7 = -18.65$ | $D_7 = 2.64$ | $N_4 = 1.7200$ | $\nu_4 = 50.3$ |
| | $R_8 = -23.54$ | | | |
| | | $D_8 = 1.49$ | | |
| $L_5$ | $R_9 = -41.67$ | $D_9 = 3.33$ | $N_5 = 1.7200$ | $\nu_5 = 50.3$ |
| | $R_{10} = -60.93$ | | | |

TABLE 7

(Embodiment 7)
F = 100 1:2.8 2ω = 65°

| | Radius of Curvature | Axial Distance | Refractive Index | Abbe Number |
|---|---|---|---|---|
| $L_1$ | $R_1 = 28.95$ | | | |
| | | $D_1 = 7.79$ | $N_1 = 1.7200$ | $\nu_1 = 50.3$ |
| | $R_2 = 90.54$ | | | |
| | | $D_2 = 2.70$ | | |
| $L_2$ | $R_3 = -131.3$ | | | |
| | | $D_3 = 2.65$ | $N_2 = 1.7552$ | $\nu_2 = 27.5$ |
| | $R_4 = 46.42$ | | | |
| | | $D_4 = 6.50$ | | |
| $L_3$ | $R_5 = 58.51$ | | | |
| | | $D_5 = 10.98$ | $N_3 = 1.6676$ | $\nu_3 = 42.0$ |
| | $R_6 = -70.86$ | | | |
| | | $D_6 = 17.49$ | (Aperture Stop) | |
| $L_4$ | $R_7 = -19.45$ | | | |
| | | $D_7 = 2.64$ | $N_4 = 1.7200$ | $\nu_4 = 50.3$ |
| | $R_8 = -24.79$ | | | |
| | | $D_8 = 1.49$ | | |
| $L_5$ | $R_9 = -40.00$ | | | |
| | | $D_9 = 3.34$ | $N_5 = 1.7200$ | $\nu_5 = 50.3$ |
| | $R_{10} = -55.87$ | | | |

With respect to focusing on a close object, the present invention is characterized by the axial movement of the rearmost negative lens component in the lens system.

In a compact lens system with a relatively wide field angle such as the present invention, the aperture stop (S) has to be located within the lens system as shown in FIGS. 1 to 3, 9 and 10. This means that a lens shutter is also located at the position of the aperture stop in the case of a camera with a rangefinder. Accordingly, a focusing system which shifts the entire lens system is particularly difficult since the lens shutter mechanism with the diaphragm mechanism has to be moved along with the shift of lens system elements, thereby requiring an extremely complex camera mechanism. Therefore, an improved focusing system in which only a part of lens system is shifted separately from the shutter and diaphragm mechanism has been sought. A partial shift focusing of a few lens elements means that at least one air space is changed from its ideal value, which in turn causes a deterioration of aberration corrections depending on the particular focusing movement. This deterioration of aberration corrections accompanying the focusing is more serious in the case of a telephoto type lens system, such as in the present invention, in which the object side principal point is located outside the lens system.

According to the present invention, a novel focusing system of the partial shift type without substantial deterioration of aberration corrections is achieved. In considering the change in aberrations with respect to focusing, it is a basic condition, for desirable small aberration changes, to reduce the changes in spherical aberration and field curvature in response to the change in the back focal distance due to the focusing. The following table 8 shows the change in the back focal distance, ΔLB, the change in the spherical aberration, ΔSA, the change in the meridional field curvature, ΔT, and a value A defined by the following formula when one of the air spaces, $D_2$, $D_4$, $D_6$ and $D_8$ is changed by 0.1 mm, respectively, with respect to an equivalent focal length f of the whole lens system, f=35 mm in case of the first embodiment:

$$A = (\Delta SA - \Delta \cdot T)/\Delta LB$$

Table 9 shows the values calculated in a similar manner with respect to the third embodiment.

TABLE 8

| | ΔLB | ΔSA | ΔT | A |
|---|---|---|---|---|
| $D_2$ | −0.227 | −0.079 | 0.175 | 1.12 |
| $D_4$ | −0.026 | 0.000 | 0.034 | 1.29 |
| $D_6$ | −0.109 | −0.036 | 0.248 | 2.60 |
| $D_8$* (mm) | −0.270 | −0.070 | 0.082 | 0.56 |

TABLE 9

| | ΔLB | ΔSA | ΔT | A |
|---|---|---|---|---|
| $D_2$ | −0.222 | −0.074 | 0.162 | 1.06 |
| $D_4$ | −0.003 | 0.002 | 0.137 | 399.0 |
| $D_6$ | −0.139 | −0.045 | 0.215 | 1.87 |
| $D_8$ | −0.285 | −0.083 | 0.067 | 0.53 |
| $D_{10}$* (mm) | −0.171 | −0.014 | 0.012 | 0.15 |

As is understood from Tables 8 and 9, the change in the air space with the asterisk, i.e., $D_8$ in case of Table 8, and $D_{10}$ in case of Table 9, shows a minimum change in the value, A, and is most suitable for focusing. The value A with respect to the air space with the asterisk is less than all other possible partial shift type focusing, e.g., by a shift of lens group ($L_3$) in FIG. 1 with the other lens components left stationary. (In such a case, two or more air spaces are changed, e.g., $D_4$ and $D_6$ are changed if the lens component ($L_3$) is shifted. However, any one of the values for A, when a plurality of air spaces are changed, can be calculated from the basic values with respect to the change in a single air space given in Table 8 or 9.)

Thus, according to the present invention, a partial shift focusing system, in which a rearmost negative lens component is shifted with the other lens components including the shutter and diaphragm mechanism left stationary, is successfully provided without substantial change in aberrations.

Figure 8A:
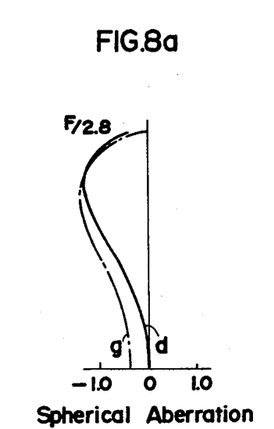
FIGS. 8a, 8b and 8c represent the graphic plots of the aberration of the third embodiment focused on a close object with magnification, 1/50.
Figure 8B:
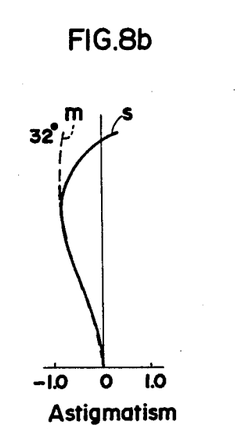
Figure 8C:
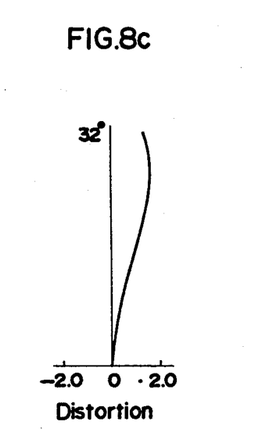

With respect to the embodiments, the rearmost negative meniscus lens element ($L_5$), which is the rearmost fifth negative lens component by itself, is shifted toward the image side upon focusing to the closer object in case of the first and second embodiments in FIGS. 1 and 2. In the third and fourth embodiments, as is indicated by FIG. 3, the image side negative meniscus lens element defined between $R_{11}$ and $R_{12}$ in the rearmost fifth negative lens component ($L_5$) is shifted toward the image side for close focusing. FIGS. 8a, 8b and 8c exemplarily show the aberration curves of the third embodiment focused to a close object with a magnification, 1/50 in accordince with the above manner of focusing. If the FIGS. 8a, 8b and 8c are compared with FIGS. 6a, 6b and 6c, the focusing system of the present invention can be appreciated.

Figure 14A:
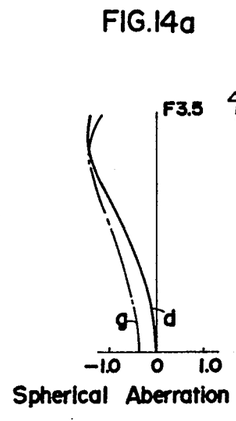
FIGS. 14a, 14b and 14c represent the graphic plots of the aberration of the fifth embodiment focused on a close object with magnification, 1/25.
Figure 14B:
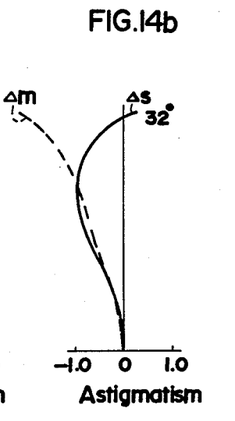
Figure 14C:
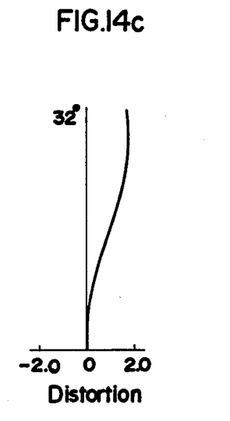

In addition, in the case of the fifth to seventh embodiments in FIGS. 9 and 10, the rearmost fifth negative meniscus single lens element ($L_5$) is shifted toward the image side upon focusing to the closer object. FIGS. 14a, 14b and 14c exemplarily show the aberration curves of the fifth embodiment focused to a closer object with a magnification, 1/25 by means of shifting the element ($L_5$) to change the value of the air space $D_8$ to 8.50 mm.

It should be noted that, although a negative meniscus single lens element is shifted for focusing in all the above embodiments of the present invention, the shiftable rearmost negative lens components of the present invention can include two or more lens elements, if necessary.

With respect to focusing, the present invention further provides a condition, with respect to the radius of curvature Rb of the object side surface of the shiftable rearmost negative lens component, as follows:

$$-0.45 < Rb/f < -0.18 \tag{12}$$

Condition (12) is a balance between the lens performances in infinity focusing and close focusing, and provides a lens system in which the aberrations are sufficiently corrected for infinity focusing and the changes in aberrations due to the close focusing are restrained. If the upper limit of the condition (12) is violated, the changes in aberrations due to close focusing are increased, although the aberration correction as to infinity focusing may be possible. On the contrary, aberration correction with respect to infinity focusing is made difficult if the lower limit is violated, although the changes in aberrations caused by close focusing are less.

Condition (12) is recommended to be modified as follows if a positive lens element is located next to the shiftable rearmost negative lens element as in FIGS. 1 and 2:

$$-0.45 < Rb/f < -0.18$$

Condition (12) is further recommended to be modified as follows if a negative lens element is located next to the shiftable rearmost negative lens element as in FIGS. 3, 9 and 10:

$$-0.45 < Rb/f < -0.22$$

A focusing system according to the present invention has numerous advantages, in addition to the above explained desirable aberration correction with respect to focusing. Namely, the tolerance to error, especially to eccentric error, in assembling the lens system is relatively liberal so as to be comparable to an entire lens system shift type focusing, which leads to a simplification of manufacturing. This contrasts with the general belief that the tolerance is quite strict in the case of a partial shift type focusing. Further, the lens system according to the present invention is extremely favorable to an automatic focus camera. In other words, the present invention allows automatic focusing control from inside of the camera, which results in a compactness of the camera, since the automatic focus control device or mechanism can be located at the inside of the camera and is capable of directly driving the shiftable lens which is also located inside of the camera close to the automatic focus control mechanism. On the contrary, if a lens system is of the type wherein the whole lens system is located in front of the aperture stop and is totally shifted with the aperture stop left stationary or a part of the lens system at the object side of the aperture stop is shifted with the other part of the lens system including the aperture stop left stationary, the automatic focus control mechanism has to be located around the lens system in front of the aperture stop and lens shutter mechanism, or a complex mechanism including a transmitting mechanism laying across the aperture stop and lens shutter mechanism is inevitable even if the automatic focus control mechanism can be located inside the camera behind the aperture stop and lens shutter mechanism.

As can be readily appreciated, it is possible to deviate from the above embodiments of the present invention and as will be readily understood by those skilled in the art, the invention is capable of many modifications and improvements within the scope and spirit thereof. Accordingly, it will be understood that the invention is not limited by the specific disclosed embodiments, but only by the scope and spirit of the appended claims.

I claim:

1. A telephoto type relatively wide angle lens system, with the object side principal point located outside the lens system, comprising, from the object to image side:
   a first positive lens component having a convex object side surface and a concave image side surface;
   a second negative lens component;
   a third positive lens component;
   an aperture stop; and
   a plurality of lens components at the image side of the aperture stop including a rearmost negative lens component having a concave object side surface and a convex image side surface, the rearmost negative lens component being shiftable along the optical axis for focusing.

2. The invention of claim 1, further comprising a negative meniscus single lens element concave to the object side located next to the rearmost negative lens component at the object side thereof, wherein the rearmost negative lens component consists of a negative meniscus single lens element.

3. The invention of claim 1 wherein the lens system fulfills the following:

$$-0.45 < \frac{Rb}{f} < -0.22$$

wherein Rb represents the radius of curvature of the object side surface of the rearmost lens component and f represents the focal length of the whole lens system.

4. The invention of claim 1, wherein the lens system fulfills the following conditiion:

$$0.45 < R_b/f < =0.18$$

wherein Rb represents the radius of curvature of the object side surface of the rearmost lens component and f represents the focal length of the whole lens system.

5. The invention of claim 4, wherein the rearmost negative lens component consists of a negative meniscus single lens element concave to the object side.

6. The invention of claim 5, further comprising, at the image side of the aperture stop, a positive single lens element located next to the rearmost negative lens component at the object side thereof.

7. The invention of claim 5, further comprising a fourth positive lens component located next to the aperture stop at the image side thereof.

8. The invention of claim 5, further comprising, at the image side of the aperture stop, another negative meniscus single lens element concave to the object side located next to the rearmost negative lens component at the object side thereof.

9. The invention of claim 8, further comprising a fourth positive lens component located next to the aperture stop at the image side thereof.

10. The invention of claim 8, wherein the second mentioned negative meniscus single lens element is located next to the aperture stop.

11. A telephoto type relatively wide angle lens system, with the object side principal point located outside the lens system, comprising, from the object to image side:
  a first positive lens component having a convex object side surface and a concave image side surface;
  a second negative lens component;
  a third positive lens component;
  an aperture stop; and
  a plurality of lens components at the image side of the aperture stop including a rearmost negative lens component having a concave object side surface and a convex image side surface wherein the plurality of lens components at the image side of the aperture stop further includes a fourth positive lens component between the aperture stop and the rearmost negative lens component, and wherein the lens system fulfills the following conditions:

$0.03f < Da < 0.12f$ $0.06f < Db < 0.15f$ wherein f represents the focal length of the whole lens system; Da represents the air space between the third lens component and the fourth lens component, and Db represents the air space between the fourth lens component and the rearmost lens component.

12. A telephoto type relatively wide angle lens system with the object side principal point located outside the lens system, comprising from the object to image side:
  a first positive lens component having a convex object side surface and a concave image side surface;
  a second negative lens component;
  a third positive lens component;
  an aperture stop, and
  a plurality of lens components at the image side of the aperture stop including a rearmost negative lens component consisting of a pair of negative meniscus lens elements both concave to the object side and a fourth positive lens component located between the aperture stop and the rearmost negative lens component, and wherein the lens system fulfills the following conditions:

$0.03f < Da < 0.12f$ $0.06f < Db < 0.15f$ wherein; f represents the focal length of the whole lens system; Da represents the air space between the third lens component and the fourth lens component; and Db represents the air space between the fourth lens component and the rearmost lens component.

13. The invention of claim 12, wherein the image side element of said pair of meniscus lens elements is shiftable along the optical axis for focusing.

14. A telephoto type relatively wide angle lens system, with the object side principal point located outside the lens system, comprising from the object to image side:
  a first positive meniscus single lens element convex to the object side;
  a second negative single lens element;
  a third positive biconvex single lens element;
  an aperture stop;
  a fourth negative meniscus single lens element concave to the object side, and
  a rearmost negative meniscus single lens element concave to the object side, wherein the lens system fulfills the following conditions:

$N_2 > N_1$ $N_2 > N_3$ wherein $N_1$, $N_2$ and $N_3$ represents the refractive indices for the first to third lens elements, respectively.

15. A telephoto lens relatively wide angle lens system comprising from the object to image side:
  a frontmost first positive lens component having a convex object side surface and a concave image side surface;
  a second negative lens component;
  a third positive lens component consisting of a doublet;
  a fourth positive lens component, and
  a rearmost fifth negative lens component having a concave object side surface and a convex image side surface.

16. A telephoto type relatively wide angle lens system comprising from the object to image side:
  a frontmost first positive lens component having a convex object side surface and a concave image side surface;
  a second negative lens component;
  a third positive lens component;
  a fourth positive lens component; and
  a rearmost fifth negative lens component consisting of a pair of negative meniscus single lens elements both concave to the object side.

17. A telephoto type relatively wide angle lens system comprising from the object to image side:
  a frontmost first positive lens component having a convex object side surface and a concave image side surface;
  a second negative lens component;
  a third positive lens component;
  a fourth positive lens component; and
  a rearmost fifth negative lens component having a concave object side surface and a convex image side surface, wherein the lens system fulfills the following conditions:

$0.03f < Da < 0.12f$ $0.06f < Db < 0.15f$ wherein f represents the focal length of the whole lens system; Da represents the air space between the third lens component and the fourth lens component, and Db represents the air space between the fourth lens component and the rearmost fifth component.

18. The invention of claim 17, wherein the first to fifth components consist of first to fifth single lens elements, respectively, whereby the lens system is of a 5-element type.

19. The invention of claim 18, wherein the fifth lens element is shiftable along the optical axis for focusing.

20. A telephoto type relatively wide angle lens system comprising from the object to image side:

a frontmost first positive lens component having a convex object side surface and a concave image side surface;
a second negative lens component;
a third positive lens component;
a fourth positive lens component, and
a rearmost fifth negative lens component having a concave object side surface and a convex image side surface consisting of a pair of negative meniscus single lens elements both concave to the object side, the image side element being shiftable along the optical axis for focusing, wherein the lens system fulfills the following conditions:

$0.03f < Da < 0.12f$ $0.06f < Db < 0.15f$ wherein: f represents the focal length of the whole lens system; Da represnts the air space between the third lens component and the fourth lens component and Db represents the air space between the fourth lens component and the rearmost fifth lens component.

21. A telephoto type relatively wide angle lens system of five elements comprising from the object to the image side:
a frontmost first positive meniscus single lens element convex to the object side;
a second negative single lens element;
a third biconvex single lens element;
a fourth negative meniscus single lens element concave to the object side; and
a rearmost fifth negative meniscus single lens element concave to the object side.

22. The invention of claim 21, wherein the lens system fulfills the following conditions:

$N_2 > N_1$ $N_2 > N_3$ wherein $N_1$, $N_2$ and $N_3$ represent the refractive indices of the glass material for the first to third lens elements, respectively.

23. The invention of claim 21, wherein the rearmost fifth negative meniscus single lens element is shiftable along the optical axis for focusing.

24. A telephoto type relatively wide angle lens system of five components and five elements comprising from the object to the image side:
a frontmost first positive meniscus single lens element convex to the object side;
a second negative single lens element;
a third biconvex single lens element;
a fourth negative meniscus single lens element concave to the object side, and
a rearmost fifth negative meniscus single lens element concave to the object side and shiftable along the optical axis for focusing, wherein the lens system fulfills the following conditions:

$N_2 > N_1$ $N_2 > N_3$ wherein: $N_1$, $N_2$ and $N_3$ represent the refractive indices of the glass material for the first to third lens elements, respectively.

25. A lens system according to the following design parameters, comprising:

| | | f = 100 1:2.8 2ω = 65° | | |
|---|---|---|---|---|
| | Radius of Curvature | Axial Distance | Refractive Index | Abbe Number |
| $L_1$ | $R_1 = 29.22$ | $D_1 = 7.20$ | $N_1 = 1.7650$ | $\nu_1 = 50.1$ |
| | $R_2 = 60.79$ | | | |
| | | $D_2 = 3.43$ | | |
| $L_2$ | $R_3 = -194.1$ | $D_3 = 2.62$ | $N_2 = 1.8052$ | $\nu_2 = 25.4$ |
| | $R_4 = 51.01$ | | | |
| | | $D_4 = 5.33$ | | |
| $L_3$ | $R_5 = 53.15$ | $D_5 = 6.69$ | $N_3 = 1.7856$ | $\nu_3 = 42.8$ |
| | $R_6 = -588.3$ | | | |
| | | $D_6 = 8.57$ (Aperture Stop) | | |
| $L_4$ | $R_7 = 319.3$ | $D_7 = 3.90$ | $N_4 = 1.6398$ | $\nu_4 = 34.6$ |
| | $R_8 = -112.5$ | | | |
| | | $D_8 = 11.0$ | | |
| $L_5$ | $R_9 = -20.85$ | $D_9 = 2.65$ | $N_5 = 1.7234$ | $\nu_5 = 37.9$ |
| | $R_{10} = -27.20$ | $D_{10} = 1.58$ | | |
| | $R_{11} = -33.33$ | $D_{11} = 2.66$ | $N_6 = 1.7440$ | $\nu_6 = 44.9$ |
| | $R_{12} = -47.48$ | | | |

26. The invention of claim 6, wherein the third positive lens component consists of a doublet.

27. A telephoto type relatively wide angle lens system of five components and six elements comprising from the object to the image side:
a frontmost first positive lens component consisting of a positive meniscus single lens element convex to the object side;
a second negative lens component consisting of a negative single lens element;
a third positive lens component consisting of a doublet of entirely positive power;
a fourth positive lens component consisting of a positive single lens element, and
a rearmost fifth negative lens component consisting of a negative meniscus lens element concave to the object side.

28. The invention of claim 27, wherein the fifth lens component is shiftable along the optical axis for focusing.

29. A telephoto type relatively wide angle lens system of six elements comprising from the object to the image side:
a frontmost first positive meniscus single lens element convex to the object side;
a second negative single lens element;
a third positive single lens element;
a fourth positive single lens element;
a fifth negative meniscus single lens element concave to the object side; and
a rearmost sixth negative meniscus single lens element concave to the object side.

30. The invention of claim 29, wherein the sixth lens element is shiftable along the optical axis for focusing.

* * * * *

UNITED STATES PATENT AND TRADEMARK OFFICE
CERTIFICATE OF CORRECTION

PATENT NO. : 4,429,958
DATED : February 7, 1984
INVENTOR(S) : Tamikazu Yamaguchi It is certified that error appears in the above-identified patent and that said Letters Patent are hereby corrected as shown below:

In Column 12, line 43, "$0.45 < R_b/f <= 18$" should be --$0.45 < R_b/f < -18$--.

Signed and Sealed this

Twenty-sixth Day of March 1985

[SEAL]

Attest:

DONALD J. QUIGG

Attesting Officer

Acting Commissioner of Patents and Trademarks

UNITED STATES PATENT OFFICE
CERTIFICATE OF CORRECTION

Patent No. 4,429,958   Dated February 7, 1984

Inventor(s) Tamikazu Yamaguchi

It is certified that error appears in the above-identified patent and that said Letters Patent are hereby corrected as shown below:

In Column 12, line 43, delete "$0.45 < R_b/f < =0.18$" and insert --$0.45 < R_b/f < -0.18$--

Signed and Sealed this

Twenty-second Day of October 1985

[SEAL]

Attest:

DONALD J. QUIGG

Attesting Officer

Commissioner of Patents and
Trademarks—Designate

UNITED STATES PATENT AND TRADEMARK OFFICE
CERTIFICATE OF CORRECTION

PATENT NO. : 4,429,958
DATED : February 7, 1984
INVENTOR(S) : Tamikazu Yamaguchi It is certified that error appears in the above-identified patent and that said Letters Patent is hereby corrected as shown below:

In Column 12, line 43, please delete "$0.45 < R_b/f <= 0.18$" and insert -- $-0.45 < R_b/f < -0.18$ --.

This certificate supersedes Certificate of Correction issued October 22, 1985.

Signed and Sealed this

Twenty-fifth Day of February 1986

[SEAL]

Attest:

DONALD J. QUIGG

Attesting Officer

Commissioner of Patents and Trademarks